United States Patent [19]

Wooldridge

[11] Patent Number: 4,491,118

[45] Date of Patent: Jan. 1, 1985

[54] FUEL MIXTURE METHOD AND APPARATUS EMPLOYING AN ELECTRICALLY HEATED SCREEN

[76] Inventor: Bobby M. Wooldridge, P.O. Box 337, Buena Vista, Ga. 31803

[21] Appl. No.: 426,023

[22] Filed: Sep. 28, 1982

[51] Int. Cl.³ ........................................ F02M 31/00
[52] U.S. Cl. .................................. 123/549; 123/593; 123/546; 219/206; 261/142
[58] Field of Search .............. 123/549, 546, 593; 219/205, 206, 207; 261/142; 48/189.2, 180.1, 189.6

[56] References Cited

U.S. PATENT DOCUMENTS

| | | | |
|---|---|---|---|
| 990,249 | 4/1911 | Low | 219/207 |
| 1,152,744 | 9/1915 | MacNutt | 123/549 |
| 1,452,883 | 4/1923 | Loesch | 219/206 |
| 1,484,617 | 2/1924 | Aske | 219/206 |
| 2,705,941 | 4/1955 | Unschuld | 219/206 |
| 3,492,457 | 1/1970 | Sult | 123/549 |
| 4,020,812 | 5/1977 | Hayward | 123/593 |
| 4,106,454 | 8/1978 | Henlis | 123/593 |
| 4,108,125 | 8/1978 | Marcoux | 123/549 |
| 4,116,183 | 9/1978 | Hayward | 123/549 |
| 4,141,327 | 2/1979 | Marcoux | 123/549 |

Primary Examiner—Ronald H. Lazarus
Attorney, Agent, or Firm—Patrick F. Henry

[57] ABSTRACT

An electrically heated screen arrangement operated from a vehicle battery and automatically controlled to heat the fuel mixture. The fuel mixture provided by the carburetor of the vehicle is drawn through the present system which comprises an outlet conduit from the carburetor delivering fuel mixture through a housing which is closed by a special screen that is electrically heated to the proper temperature and then through a passageway and a cooling device comprising a screen in relationship together with a ceramic filter in a housing. The temperature of the screen is sensed and monitored. Several screens and coolers may be mounted in series.

10 Claims, 4 Drawing Figures

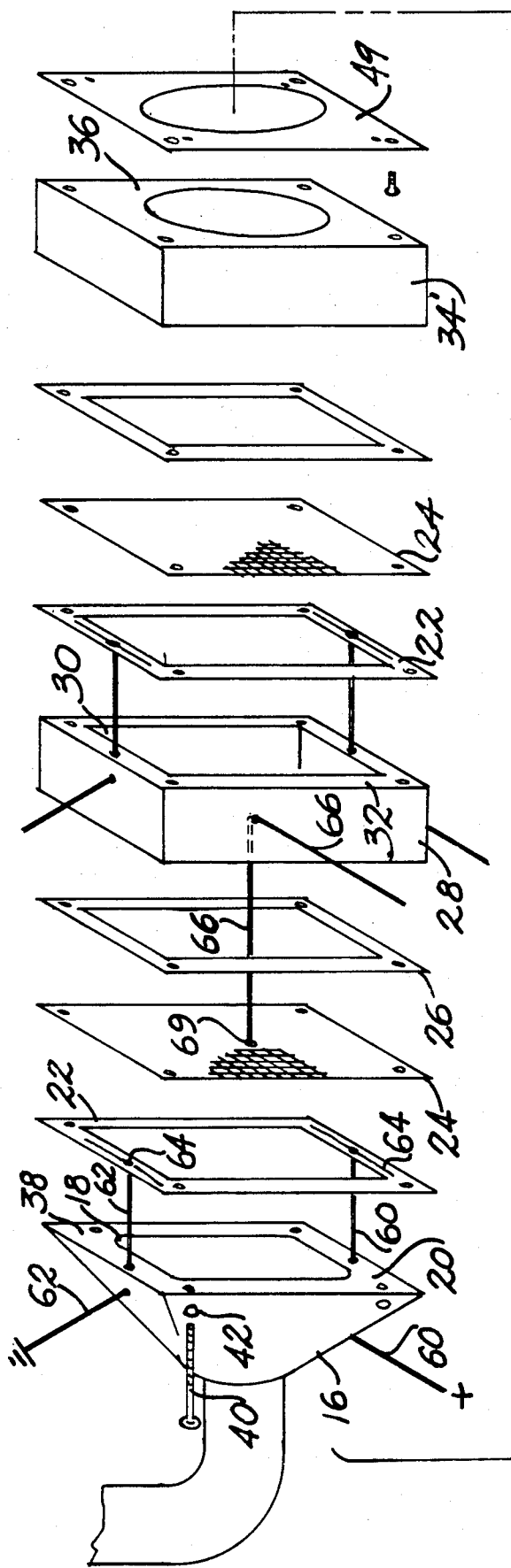
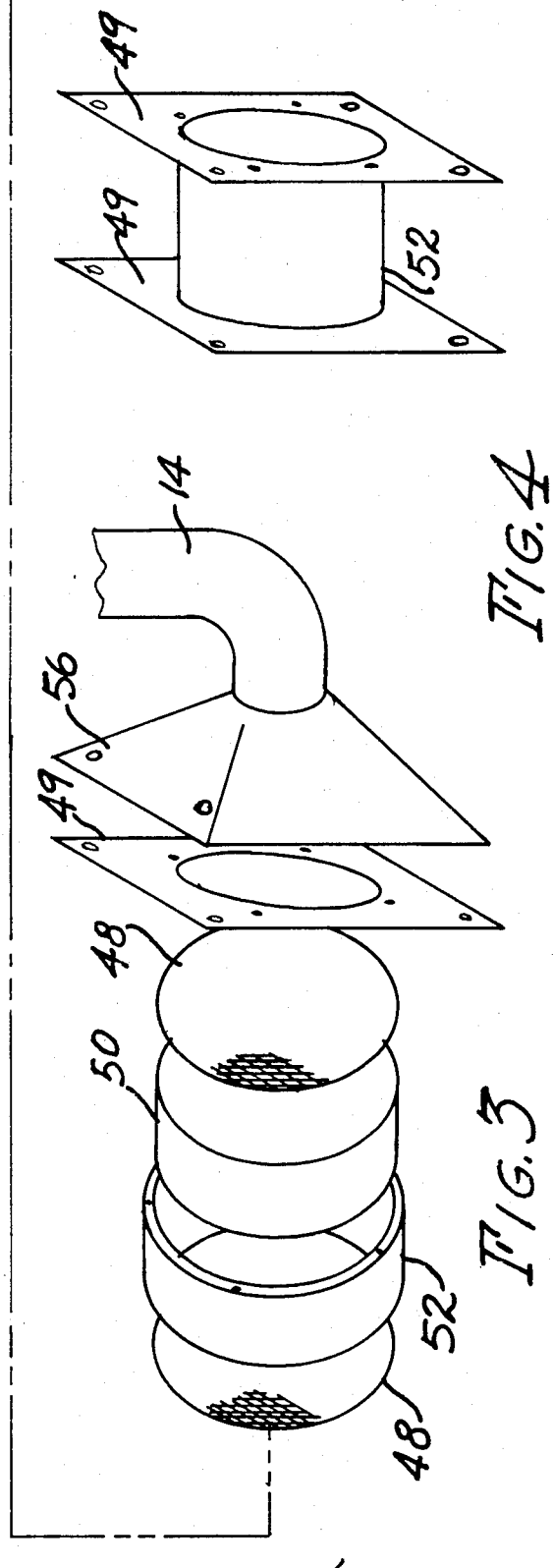
FIG. 3
FIG. 4

FUEL MIXTURE METHOD AND APPARATUS EMPLOYING AN ELECTRICALLY HEATED SCREEN

BACKGROUND OF THE INVENTION

1. Field of the Invention

The field of the invention is internal combustion engines and more particularly charge-forming devices employing a heating means operated electrically from a battery to heat a metal screen against which the fuel mixture is directed.

2. Background of the Invention

A general discussion of previous methods and apparatus is contained in my copending U.S. patent application Ser. No. 06/381,436 filed 05/24/82 (now U.S. Pat. No. 4,469,077), wherein is described a system in which the fuel mixture is heated by means of heated exhaust gases from the vehicle engine. This is acceptable for certain uses and operation but it has been found desirable to provide an alternative method of heating the fuel mixture which does not depend upon the vehicle exhaust gases and other heat from the engine but rather is operated from a source of electricity such as the vehicle battery. Electrically operated devices have the advantage of reducing the size of the installation and the weight of the apparatus as well as making it easier for installation in certain types of vehicle engines.

SUMMARY OF THE INVENTION

An apparatus and method for receiving a volume of fuel mixture from a conventional carburetor and directing same to be heated by bringing the fuel mixture into contact with a foraminous surface such as a woven metal screen which is supported in the passageway through which the fuel mixture passes together with a source of electricity such as a battery and an automatic means such as an automatic control for controlling the heat of the fuel mixture by controlling the heat of the screen.

An object of this invention is to provide a simple and expedient way of modifying an existing vehicle engine, or incorporating same into a new engine, for heating and cooling the fuel mixture after mixing in the carburetor and prior to delivery to the explosion chamber of the vehicle so as to improve combustion and increase efficiency.

Another object of this invention is found in the particular use of the electrically operated heating system whereby the fuel mixture is heated in a closed passageway while moving from the carburetor to the explosion chamber of the vehicle so as to heat the fuel into a more efficient mixture.

Another advantage of the present invention is in the simplicity of installation in existing vehicles, especially in crowded vehicle spaces.

An advantage is that electric heat provides instant heat for proper gassing for cold starts. No warm up time is required.

BRIEF DESCRIPTION OF THE DRAWINGS

FIG. 3 is a disassembled assembly view of part of the apparatus shown in FIG. 1.

FIG. 4 is a perspective view of a cooler unit in FIGS. 1 and 3.

DESCRIPTION OF A PREFERRED EMBODIMENT

Figure 1:
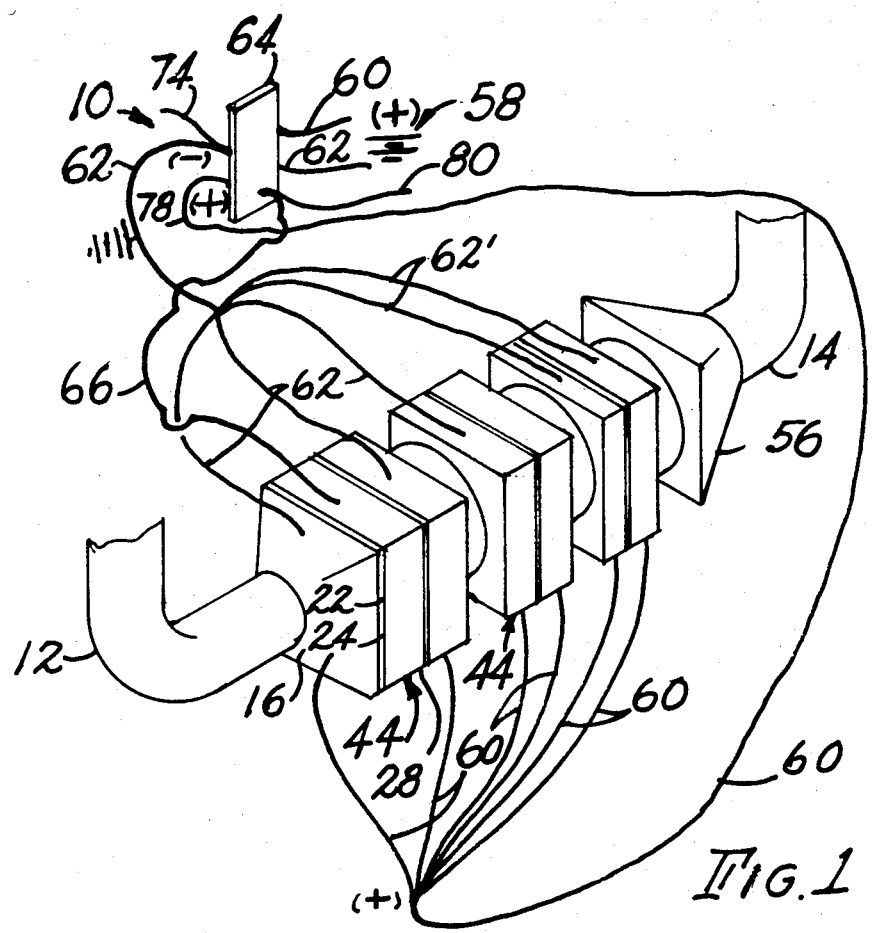
FIG. 1 is a perspective view of the present apparatus with the conduits broken away from a typical carburetor that is not shown and with the electrical wiring thereon.

In FIG. 1 the apparatus 10 has an inlet pipe or conduit 12 and an outlet pipe or conduit 14 from and to a conventional carburetor (not shown). Inlet 12 and outlet 14 may be connected to the carburetor in the manner shown in my copending application so that a fuel mixture from the carburetor is directed through the inlet 12 to a passageway which passes through a series of sandwich panels. A housing 16 is connected to inlet 12 and as seen in more detail in FIG. 3 housing 16 has an opening 18 therein and a perimeter flat face 20 on which is mounted a gasket or insulator 22 against which is mounted a foraminous member such as the electrically energized NICHROME (trademark) screen 24 on the other side of which is mounted therewith another insulator frame 26 against a rectangular spacing frame 28 having a rectangular opening 30 therein and a flat face 32 against which is assembled another insulator 22, screen 24, insulator 26 against another spacing frame 34 having a circular passageway 36 therein. Housing 16 has 4 screw openings 38 on the face 20 thereof to receive long assembly screws 40 which are inserted through opening 42 placed in alignment through the respective elements 22, 24, 26 and 28.

As shown in FIG. 1, an assembly of two screens 24, insulators 22, and spacing frame 28 in the manner shown in FIG. 3 like a sandwich constitutes one screen element 44 which may be assembled with like and identical screen elements 44 (See FIG. 1) with cooling assembly unit 46 (similar to the one shown in my copending application) comprising a cooling screen 48 constructed of woven fabric material, wire, synthetic and the like together with a ceramic, plastic or the like cooling filter 50, and another screen 48 all of which are assembled together between plates 49 in a circular housing 52 constructed of plastic, metal or the like which is fastened in place in the manner shown in FIG. 1 between the elements 44. The last cooling assembly unit 46 is assembled with and against an exit housing 56 which is attached to the inlet pipe 14 on the carburetor. The last spacing frame 34' has a circular opening as do the plates 49.

Each screen 24 is electrically energized from a source such as a vehicle battery 58 having one wire 60 attached to the plus terminal thereof and another wire 62 attached to the negative terminal thereof electrically connected to each of the screens 24 by means of contacts 64 on the insulators 22 which contacts 64 are faced against the screens 24. Screens 24 are electrically connected together by means of assembly screws 40 passing therethrough. A control 68 is electrically inserted in the circuit of the wires 60, 62 and it has wired electrically therein a temperature sensing control and switch (not shown).

In the operation of the device, the contact by the gaseous vapor of the fuel mixture with the heated screens 24 as the fuel mixture passes therethrough causes a vaporization and separation of the fuel mixture which when reintroduced into the explosion chamber of the vehicle engine results in a more efficient operation, in the manner described in my copending application Ser. No. 381,436. The entire device or individual units 44 may be wrapped in an insulating material such as a fiberglass sheet covered by aluminum foil.

Control 68 regulates the amount of electricity and therefore the temperature of each of the screens 24. The control 68 includes a thermocouple sensing means 69 which is capable of sensing the temperature of the screen 24 through a sensing wire 66 attached to one of the screens 24 (See FIG. 3). The control 68 per se does not form a part of this invention because it is a common item obtainable on the market such as a Model No. E-924, Switch No. D20, and a Thermocouple No. J-28 from the United Electric Control Company whose address is 85 School Street, Watertown, Mass., 02172.

When the screens are heated to proper temperature (approx. 600° F.) the fuel-air mixture strikes the screens and the liquid gases. For example, when gas is dropped on a hot exhaust pipe the liquid evaporates rapidly, just as it does when it touches the heated screens.

Figure 2:
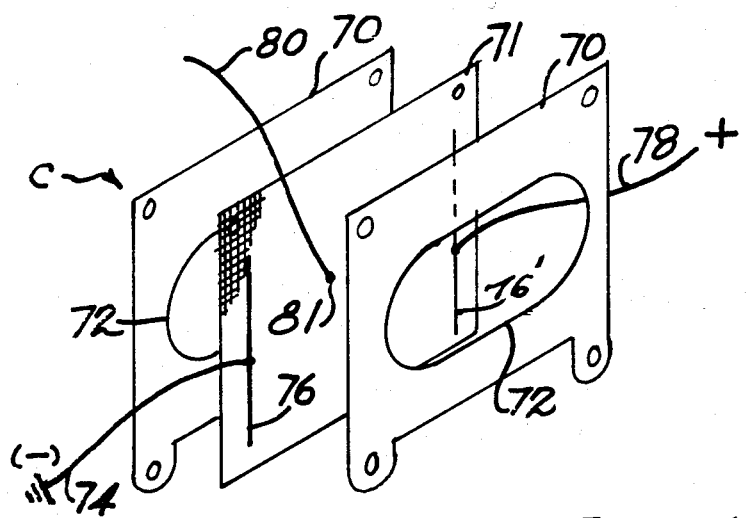
FIG. 2 is a perspective view of an electrically heated screen assembly to be installed under the carburetor.

The carburetor attachment C shown in FIG. 2 comprises rectangular insulators 70 assembled with a screen 71 and each insulator 68 has a passageway 72 therein for the passage of the fuel mixture. A ground wire (−) 74 is connected to one contact bar 76 and the other wire (+) 78 is connected to another contact bar 76. A sensor probe wire 80 is connected to a thermocouple 81 or screen 71. Wires 74 and 78 are connected to the battery and wire 80 is connected to the contact 64 at the same place as the sensing wire 66.

The operation of the carburetor attachment C is the same as that of the screens 24 previously described.

While I have shown and described a particular embodiment of this invention together with a suggested mode of operation this is by way of illustration and does not constitute any limitation on the invention since various alterations, changes, deviations, revisions and departures may be made without departing from the scope of my invention as defined only by a proper interpretation of the appended claims.

What is claimed:

1. In a fuel mixture system for an internal combustion engine having a fuel mixture inlet from a carburetor and a fuel mixture outlet back to the intake of an internal combustion engine:
    means for supporting a foraminous member to receive the fuel mixture therethrough comprising a support element having a three dimensional support spacing frame,
    opposed spaced foraminous members such as a screen supported on opposite sides of said support spacing frame and between said fuel inlet and said fuel outlet for electrical energization to heat the fuel mixture,
    electrical means for energizing said foraminous members,
    control means for controlling the temperature of said foraminous members,
    a three-dimensional housing connecting the fuel mixture inlet to said support element,
    means attaching said housing with said outlet,
    a cooling unit in communication with said foraminous members,
    and there being a plurality of said support elements and cooling units arranged in communication in series.

2. The device claimed in claim 1 wherein said foraminous member is a screen.

3. The device claimed in claim 1 wherein there is an insulator separator on each side of said foraminous member.

4. The device in claim 1 wherein said cooling unit comprises a cooling screen and a filter made from ceramic, plastic and the like.

5. The device in claim 1 wherein there are insulators on opposite sides of said foraminous members and electrical wiring to each foraminous members, said insulators each having an opening therein for the passage of fuel mixture.

6. The device in claim 3 wherein each insulator is flat and each housing has a corresponding flat portion to receive a respective insulator thereagainst.

7. The device in claim 6 wherein each foraminous member is a screen and each screen has an electrical contact and a positive and a negative electric wire leading thereto, and a temperature sensing means on at least one of said screens.

8. The device in claim 7 wherein there is a carburetor screen for the carburetor, support means for said screen, electrical means for energizing said screen and a sensing means for sensing temperature.

9. The device in claim 1 wherein each screen element comprises at least two screen frames having a screen on each side thereof.

10. The device in claim 9 wherein there are insulators on said frames on opposite sides of said foraminous members.

* * * * *